March 8, 1932.  H. RABE  1,848,803
AUTOMATIC FURNACE REGULATING DEVICE FOR STEAM BOILERS
Filed Aug. 15, 1930  2 Sheets-Sheet 2
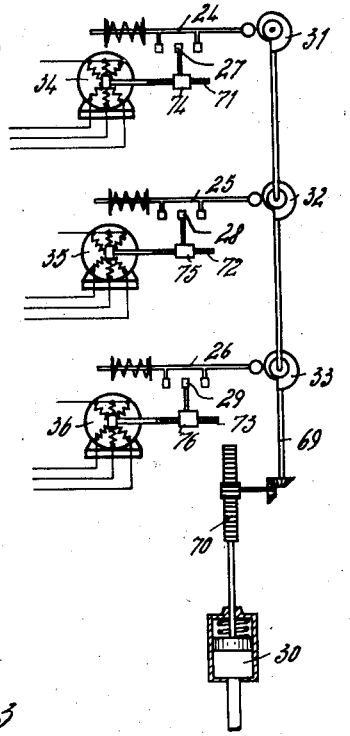
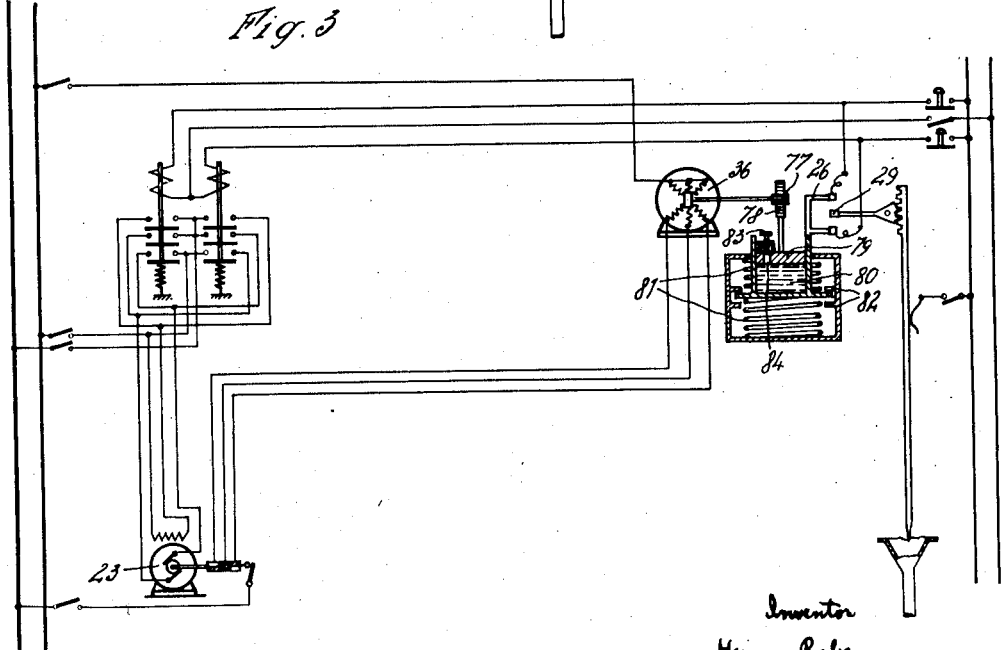
Inventor
Heinz Rabe
by Knight Bro
attorneys Patented Mar. 8, 1932

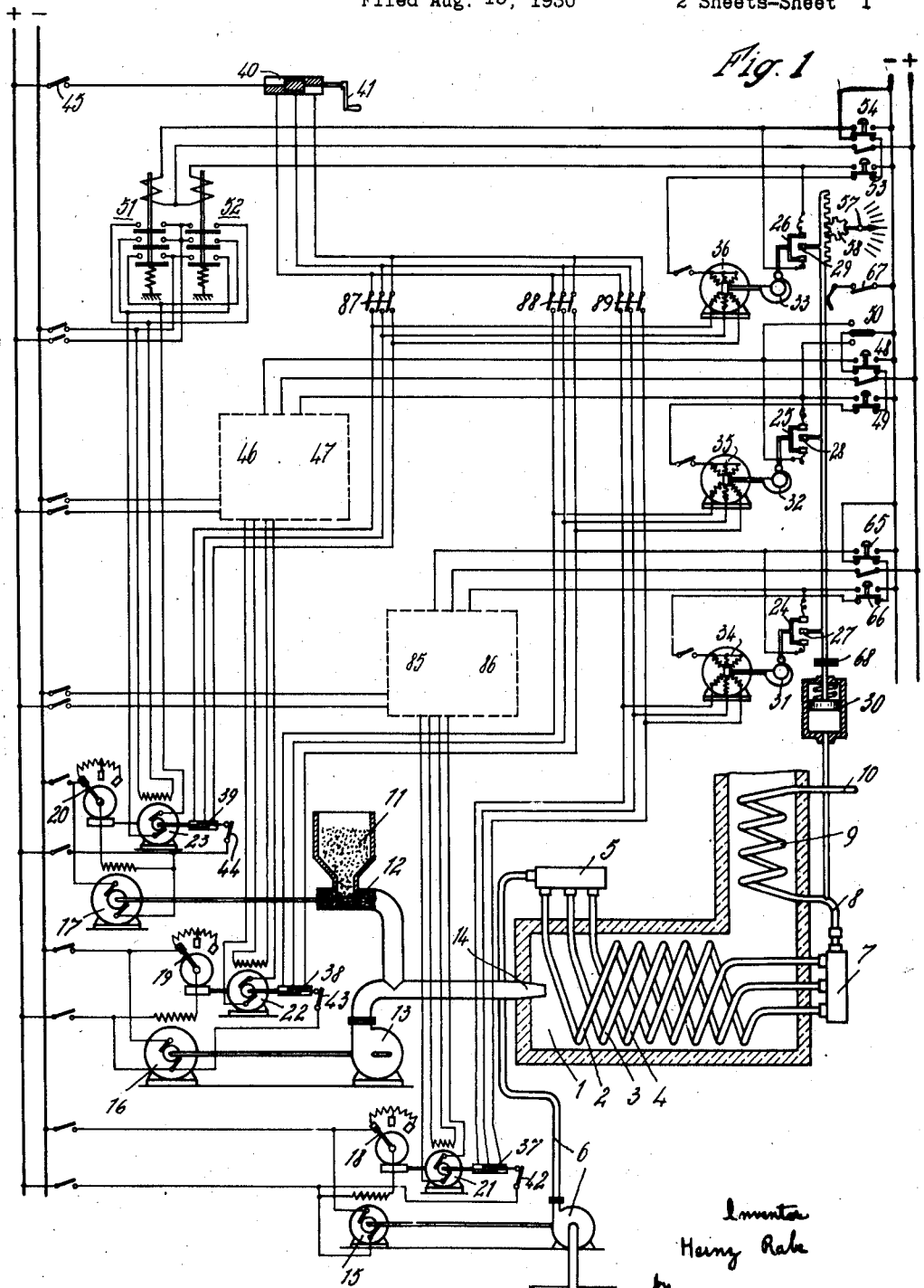

1,848,803

UNITED STATES PATENT OFFICE

HEINZ RABE, OF BERLIN-WILMERSDORF, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

AUTOMATIC FURNACE REGULATING DEVICE FOR STEAM BOILERS

Application filed August 15, 1930, Serial No. 475,611, and in Germany July 23, 1929.

My invention relates to an automatic furnace regulating device for steam boilers.

In the prior art are already known various types of automatic regulating devices for steam boilers, in which the fuel, the quantity of air, and in case of necessity the quantity of water as well, are jointly adjusted in dependence on the boiler load. This permits the attainment of a favorably constant condition between the supplied quantity of water and the amount of heat (fuel and air) independently from the corresponding boiler load. Some of the regulating devices adapt themselves at first slowly to the load variations. Such devices are particularly useful for boilers, having a great water capacity. For boilers however, consisting for instance only of heated tube system, the devices must at once respond to every load variation, since these boilers are not capable of storing up, and at a given time cannot raise any more steam than the amount corresponding to the amount of water supplied by the feed pump. The main object involved in rendering such boilers flexible therefore is to reduce the number of the transmission members, switched in between the impulse transmitting device which calls for medium supply and the regulating device which carries out the order.

Accordingly the invention provides means by which the control of the circuit closing contactors for the motors which adjust the regulating organs of the different supply devices, are directly influenced by the impulse transmitting device, which is sensitive to the boiler requirement. For this purpose various movable contacts can be arranged on the impulse transmitting device designed for instance as a piston manometer, which contacts, in cooperation with fixed contacts close the circuits for the circuit closing contactors of the adjusting motors of the regulating organs. To avoid an overregulation the normally stationary contacts carry out according to the invention a reverse movement corresponding to the rotation of the adjusting motor. For this purpose the adjustment of the contact holder can be for instance varied by the rotation of a cam. The shape of the cams should be carried out in compliance with the required regulating characteristics. Should the boilers be operated according to different characteristics, cams of various shapes can be provided as the case may be. In order that the rotation of a cam corresponds to that of the adjusting motor, it is possible to carry out the rotation by a second motor, which runs in synchronism with the adjusting motor. A kinematic reversal of this arrangement can be carried out by rotating the piston manometer by means of a rack, pinion, a pair of bevel gears and of a shaft on which the cams rest and by means of tappets which actuate the contacts. Moreover the pointer of the diaphragm manometer can be used to introduce the impulse. For various purposes it may be desirable to switch off the automatic control and to set another charge. In this case the contact holder can be adjusted by hand. This is particularly convenient in case several boilers are connected to the same impulse transmitting device, and if the quantity of steam to be supplied by each of the several boilers is different. Moreover the regulating equipment can be designed in such a manner that the quantity of steam supplied by the different delivery devices can be corrected by means of additional impulses. For combustion air this can for instance be done by a $CO_2$-meter, for the fuel by a thermostat, which responds to a change of steam temperature. The adjustment of the regulating organs by means of an additional impulse is effected independently from the corresponding position of the main impulse transmitting device. Finally the connection can be carried out in such a manner that the different quantities of supply can be changed at will independently of the position of the main impulse transmitting device by means of push-button switches. For various purposes, for instance for the operation of a boiler at constant load, it is convenient to switch off entirely the main impulse transmitting device and to carry out the regulation simply by hand. In this case the action of the impulse is maintained.

An example of the invention is illustrated in the accompanying drawings, in which Fig. 1 shows a diagrammatic lay-out of a boiler feed control outlined hereinbefore, and Figs. 2 and 3 show modifications of certain details, which will be referred to more specifically hereinafter.

Referring to Fig. 1, the furnace 1 is traversed helically by three tube coils 2, 3, 4 connected in parallel. They are supplied with water from a distributor 5, the water being supplied to the distributor 5 through the feed pipe 6. The produced steam is collected in the manifold 7 and is delivered through the pipe 8 into the superheater 9. The superheated steam is supplied through the pipe 10 to the consumer (not shown). The heating of the furnace 1 is effected, as illustrated in the drawing, by pulverized coal. This coal is conveyed from the bunker 11 by means of worm 12 to the burner 14, and blown into the furnace by means of the combustion air, delivered by the blower 13. The feed pump 6, the blower 13 and the worm 12 are each driven by an electric motor 15, 16 and 17 respectively. The corresponding quantity of medium delivered by these supply means depends therefore upon the speed of the driving motors. The speed of the motors 15, 16, 17 is determined by the position of the switch levers 18, 19 and 20 respectively, of the pertaining shunt regulators, connected in series with the exciting winding. The position of these levers can be changed by the servo motors 21, 22 and 23. The servo motors are put into operation by means of circuit closing contactors 85, 86 as well as 46, 47 and 51, 52 (of which only 51, 52 are shown in detail), when the corresponding movable contacts 27, 28 and 29, fixed to the movable element of the piston manometer 30, come into contact with the lower or upper contact of the pertaining holders 24, 25 and 26. According to whether the upper or lower contacts of these holders are closed, circuits will be closed which cause the servomotors to run in clockwise or counter-clockwise direction.

To avoid overregulation it is necessary to break such a contact immediately after the movable contact comes into contact with a fixed contact. For this purpose the cams 31, 32 and 33 respectively are provided, by means of which the position of the normally fixed contact holders 24, 25 and 26 can be shifted. These cams are designed in shape according to the desired regulating characteristic of the pertaining medium supply, and are shifted respectively by the auxiliary motors 34, 35 and 36, which are operated in timed relation with the pertaining servomotors 21, 22 and 23. The synchronism can for instance be obtained by arranging special distributors 37, 38 and 39 on the shafts of the motors 21, 22 and 23 respectively, which distributors generate rotating fields in the motors 34, 35 and 36. The adjustment of the contact holders can be also effected by hand, for instance when it is desired to vary the steam supply. For this purpose a distributor 40 is provided, which can be rotated by a crank 41. When this distributor is to be operated the connection between motors 34, 35 and 36 and the pertaining servomotors 21—23 must be interrupted. The switches 42, 43 and 44 through which the motor driven distributors are supplied with current must therefore be opened while the switch 45 must be closed. The corrections of the regulation can be carried out by means of the push-button switches 48, 49, 55, 54 as well as by 65, 66. By the latter the contactor coils of the switches 46, 47, 51, 52 as well as 85, 86 can be energized independently from the corresponding position of the manometer operated contacts 27, 28 and 29. Also the adjustment of the switch 50 which imparts correcting impulses from the $CO_2$ meter, is independent from the corresponding position of the current supply to the operating bar of the piston 28. The contact manometer can be switched off by the switch 67. Finally the piston rod of the piston manometer or the below specified contact manometer can be disconnected from its contact bar by loosening the coupling 68 from the manometer, and the bar may now be actuated by hand by means of pinion 58 and switch lever 57.

The kinematic reversal of the cam control arrangement for the contacts 24, 25, 26 is apparent from Fig. 2. The piston manometer 30 in rising and dropping here rotates by means of a rack 70, the cam shaft 69 carrying the pertaining cams 31, 32 and 33. By the latter the spring controlled contact holders 24, 25 and 26 are shifted in one or the other direction. After the manometer action has closed one or the other circuit controlled by these holders, the interruption of the contact is effected by the auxiliary motors 34, 35 and 36, which displace the spindle nuts 74, 75 and 76 by rotating the spindles 71, 72 and 73, which carry the pertaining contacts 27, 28 and 29. Otherwise the arrangement is the same as shown in Fig. 1.

Fig. 3 illustrates finally a third arrangement in which for instance a diaphragm manometer imparts the impulses and in which a non rigid coupling is provided in the reactive equalizing equipment. The operation of this equipment is as follows: as soon as for instance a closing of the circuit between the lower contact of the holder 26 and the contact 29 is brought about by means of the decreasing steam pressure, the servo motor 23 is put into operation by means of the contact and transmits its movement synchronically to the pertaining auxiliary motor 36. The latter moves the piston 79 downward by means of the pinion 77 and the rack 78. The piston is placed within the cylinder 80, the latter being normally held in a middle position by means of a spring 81. As a result of the increasing pressure in the chamber, filled with oil beneath the piston 79, the cylinder and consequently the contact holder 26 will be as far displaced during the downward stroke of piston 79 as the stops 82 permit. In this case the contact at point 26 will be interrupted. Through a vent 84 in the piston, capable of being regulated by a valve 83, the oil escapes slowly from beneath pressure of the spring 81 under the piston 79, so that cylinder 80 is gradually returned by spring 81 into middle position, and consequently the contact holder 26 returns to its normal position. In case the contact 29 should not yet have changed in the meantime its position due to the regulating effect initiated by the regulating impulse, the operation is repeated, otherwise the regulating device will remain at rest.

The arrangement illustrated in Fig. 3 represents also as Fig. 2 only a modified arrangement of a portion of Fig. 1 and is to be considered as supplemented by Fig. 1.

I claim as my invention:

1. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and means for each stationary contact, connected with the pertaining servomotor and operated at a definite speed ratio with respect to its servomotor, for shifting its stationary contact to open the pertaining movable contact closed by the action of said responsive element.

2. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and an electric auxiliary motor, and means for each stationary contact, connected with the pertaining servomotor and operated at a definite speed ratio with respect to its servomotor, for shifting its stationary contact to open the pertaining movable contact closed by the action of said responsive element.

3. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and a cam for each stationary contact, and an auxiliary electric motor operating it at a definite speed ratio with respect to the pertaining servomotor, for shifting its pertaining stationary contact to open the pertaining movable contact closed by the action of said responsive element, said cams having each a contour suitable for shifting its contact at a rate commensurate with the particular characteristic of the pertaining medium supply.

4. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and an electric auxiliary motor, and means for each stationary contact, connected with the pertaining servomotor and operated at a definite speed ratio with respect to its servomotor, for shifting its stationary contact to open the pertaining movable contact closed by the action of said responsive element, and a supplemental regulating element for correcting the normal supply ratio between the several media, set by the normal operation of the several servomotors, and means for rendering inoperative the stationary contact shifting means of the particular medium supply supplementally regulated.

5. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and an electric auxiliary motor, and means for each stationary contact, connected with the pertaining servomotor and operated at a definite speed ratio with respect to its servomotor, for shifting its stationary contact to open the pertaining movable contact closed by the action of said responsive element, and a supplemental hand operated regulating element for each medium supply, for correcting the normal supply ratio between the several media, set by the normal operation of the several servomotors, and means for rendering inoperative the stationary contact shifting means of the particular medium supply supplementally regulated.

6. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and an electric auxiliary motor, and means for each stationary contact, connected with the pertaining servomotor and operated at a definite speed ratio with respect to its servomotor, for shifting its stationary contact to open the pertaining movable contact closed by the action of said responsive element, means for disconnecting the control of all of said medium supply devices from said regulating element, and hand controlled means for individually controlling the supply of the several media to the boiler.

7. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and an electric auxiliary motor, and means for each stationary contact, connected with the pertaining servomotor and operated at a definite speed ratio with respect to its servomotor, for shifting its stationary contact to open the pertaining movable contact closed by the action of said responsive element, means for disconnecting the movable contacts from said regulating element, and hand operated means for jointly actuating said contacts in place of said regulating element.

8. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and a cam for each stationary contact, and an auxiliary electric motor operating it at a definite speed ratio with respect to the pertaining servomotor, for shifting its pertaining stationary contact to open the pertaining movable contact closed by the action of said responsive element, said cams having each a contour suitable for shifting its contact at a rate commensurate with the particular characteristic of the pertaining medium supply, and circuit control means for individually rendering inoperative the cam operating means for the medium supplies, and hand controlled means for individually operating a cam whose normal operating means have been rendered inoperative.

9. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, and an electric auxiliary motor, and means for each stationary contact, connected with the pertaining servomotor and operated at a definite speed ratio with respect to its servomotor, for shifting its stationary contact to open the pertaining movable contact closed by the action of said responsive element, means for disconnecting the movable contacts from said regulating element, and hand operated means for jointly actuating said contacts in place of said regulating element, and an indicator on said hand operated means for showing the extent of the manual operation.

10. An electric regulating arrangement for simultaneously automatically regulating by a common regulating impulse the supplies of the several media required for the operation of boilers, comprising a regulating element, responsive to the effect of load variations of the boiler, electric motor operated devices for supplying the several operating media, a servomotor for each electric motor for controlling its speed, current supply circuits for said servomotors, including for each medium supply a normally stationary contact and a movable counter contact operated by said responsive regulating element for actuating all of said servomotors on response of said element to load variations, said regulating element having for said contact operation a rack and pinion gear, a shaft driven by said pinion, an operating cam for each contact on said shaft, said cams having each a contour suitable for shifting their pertaining contact at a rate commensurate with the particular characteristic of the pertaining medium supply.

In testimony whereof I affix my signature.

HEINZ RABE.